United States Patent
McCuller

(10) Patent No.: US 7,865,551 B2
(45) Date of Patent: Jan. 4, 2011

(54) DETERMINING INFLUENTIAL/POPULAR PARTICIPANTS IN A COMMUNICATION NETWORK

(75) Inventor: Patrick McCuller, San Diego, CA (US)

(73) Assignee: Sony Online Entertainment LLC, San Diego, CA (US)

(*) Notice: Subject to any disclaimer, the term of this patent is extended or adjusted under 35 U.S.C. 154(b) by 295 days.

(21) Appl. No.: 11/381,975

(22) Filed: May 5, 2006

(65) Prior Publication Data
US 2007/0260725 A1 Nov. 8, 2007

(51) Int. Cl.
G06F 15/16 (2006.01)
(52) U.S. Cl. ...................................................... 709/204
(58) Field of Classification Search .......... 709/204–207
See application file for complete search history.

(56) References Cited

U.S. PATENT DOCUMENTS

| 2005/0075917 | A1* | 4/2005 | Flores et al. ................... 705/8 |
| 2006/0173957 | A1* | 8/2006 | Robinson et al. ............ 709/204 |
| 2006/0248573 | A1* | 11/2006 | Pannu et al. ................... 726/1 |
| 2006/0271564 | A1* | 11/2006 | Meng Muntz et al. ....... 707/100 |
| 2007/0168533 | A1* | 7/2007 | Canright et al. ............. 709/230 |
| 2007/0214097 | A1* | 9/2007 | Parsons et al. ................ 706/12 |

OTHER PUBLICATIONS

"PieSpy Social Network Bot Inferring and Visualizing Social Networks on IRC" Paul Mutton. Dec. 04, 2003. Internet Archive WaybackMachine http://web.archive.org/web/20031204185952/http://jibble.org/piespy/.*
International Search Report / Written Opinion issued in PCT/US2007/67810 on Jun. 10, 2008.

* cited by examiner

Primary Examiner—Benjamin R Bruckart
Assistant Examiner—Noel Beharry
(74) Attorney, Agent, or Firm—Procopio, Cory, Hargreaves & Savitch LLP

(57) ABSTRACT

Determining influential and/or popular participants in a network using messages exchanged among a group of participants. One method includes: representing the group of participants and the messages exchanged among the group of participants as nodes and links, respectively; analyzing the messages to produce message relevant data for each node; and propagating the message relevant data of the each node out to other nodes in the network to produce a corresponding influence value for each node, wherein the corresponding influence value indicates relative size and strength of social activity or connections of a participant corresponding to each node.

19 Claims, 6 Drawing Sheets

DETERMINING INFLUENTIAL/POPULAR PARTICIPANTS IN A COMMUNICATION NETWORK

CROSS-REFERENCE TO RELATED APPLICATIONS

This application is related to U.S. patent application Ser. No. 11/381,971, entitled "Determining Social Activity Profile of a Participant in Communication network", filed concurrently with this application and incorporated herein by reference.

BACKGROUND

The present invention relates to a communication network, and more specifically, to determining influential and/or popular participants in such a communication network.

In typical communication network applications, such as online games, a player may be engaged in social experience while interacting with communication partners and virtual worlds. The effectiveness of the social experience can be important to the player, who may have many choices of online games and other activities. The effectiveness of the social experience is also important to online game providers in retaining players to be engaged in the games offered by the providers.

It has been well established that players tend to play and stay with games that "their friends play", which drives clusters of players to certain games. Also, it has been observed that players rarely have the time or attention for more than one, or perhaps two, online games at a time. Thus, players usually will stop playing a particular game when another game has their attention, or the attention of a sufficient proportion of their friends. Therefore, online game providers have encouraged the formation of online friendship groups by providing "guilding" and grouping tools, which allow players to associate themselves with a group of players for a long or short term. This is somewhat effective in attracting and retaining players. However, other incentives can be provided to more effectively attract and retain players.

Accordingly, many online game providers communicate and interact with their "game community", a collective group of players for one or more online games. However, to effectively communicate and interact with their "game community", the game providers must spend time and money determining which players represent or are the leaders of the game community internally.

One method used to identify community leaders is by examining formal player organizations, such as guild membership, which may be structured as in president/vice president/officer/member/initiate. In this case, guild presidents are the de facto leaders, and guild membership or activity can be used to rank presidents to find the most "powerful" of the guild leaders. Another method used to identify community leaders is to examine message board posts. Outside of the game itself, online game providers typically also provide a "bulletin board" system of messaging for players to communicate with each other and with the game provider's representatives. Through personal experience, or with automated tools, provider representatives nominate players for their activity level, the quality and quantity of their posts, or other related criteria. This process may be partially or fully automated as well. However, other methods can be provided to more effectively identify influential and/or popular players.

SUMMARY

Implementations of the present invention provide methods, systems, apparatus, and programs for determining influential and/or popular participants in a network using messages exchanged among a group of participants.

In one implementation, the method includes: representing the group of participants and the messages exchanged among the group of participants as nodes and links, respectively; analyzing the messages to produce message relevant data for each node; and propagating the message relevant data of the each node out to other nodes in the network to produce a corresponding influence value for each node, wherein the corresponding influence value indicates relative size and strength of social activity or connections of a participant corresponding to the each node.

In another implementation, the system includes: a representation module configured to represent the group of participants and the messages exchanged among the group of participants as nodes and links, respectively; a message data analysis module configured to analyze the messages to produce message relevant data for each node; and a propagation module configured to propagate the message relevant data of the each node out to other nodes in the network to produce a corresponding influence value for the each node, wherein the corresponding influence value indicates relative size and strength of social activity or connections of a participant corresponding to the each node.

DETAILED DESCRIPTION

Implementations of the present invention provide methods, systems, and programs for determining and selecting influential and/or popular participants in a communication network. In one implementation, the determination of influential and/or popular participants is made by analyzing the communications of participants and graphing their social network. The analysis provides the relative strength of the participants' social network online, as well as their relative community influence including the size and extent of their online social network.

Features provided in the implementations of the present invention can include, but are not limited to, one or more of the following.

FIGS. 1 through 5 illustrate terms used in connection with determining and selecting influential and/or popular participants in a communication network. For example, a player, while playing a game online, communicates with other players using "emotes" or "body gestures" to express emotions or horseplay. The player can also use messaging to communicate with other players by sending semi-private text packets or notes. Thus, each message has an Origin player and one or more Destination player(s), forming a distinct message path.

Figure 2:
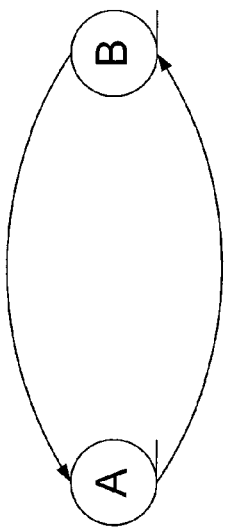
FIG. 2 shows two separate links representing two-way paths between Player A and Player B.
Figure 1:
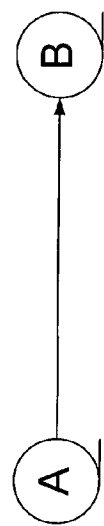
FIG. 1 shows a message path from Player A to Player B illustrated as a link.
Figure 3:
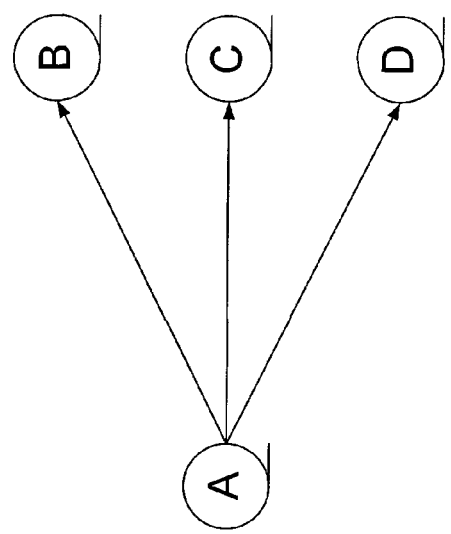
FIG. 3 shows a one-to-three link setup with three message paths from Player A to each of Players B, C, and D.

A message path or part of a message path that connects two participants, in one direction, is referred to as a link. FIG. 1 shows a message path from Player A to Player B illustrated as a link. A link can be two-directional, or two separate links can represent two-way paths. FIG. 2 shows two separate links representing two-way paths between Player A and Player B. FIG. 3 shows a one-to-three link setup with three message paths from Player A to each of Players B, C, and D.

Figure 4:
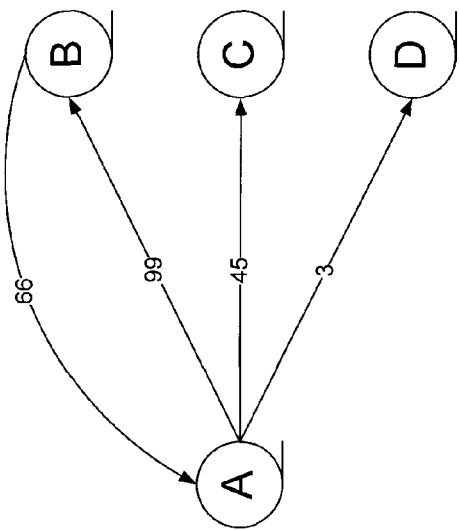
FIG. 4 is an example of a communication network illustrating Player A in communication link with communication partners B, C, and D.
Figure 5:
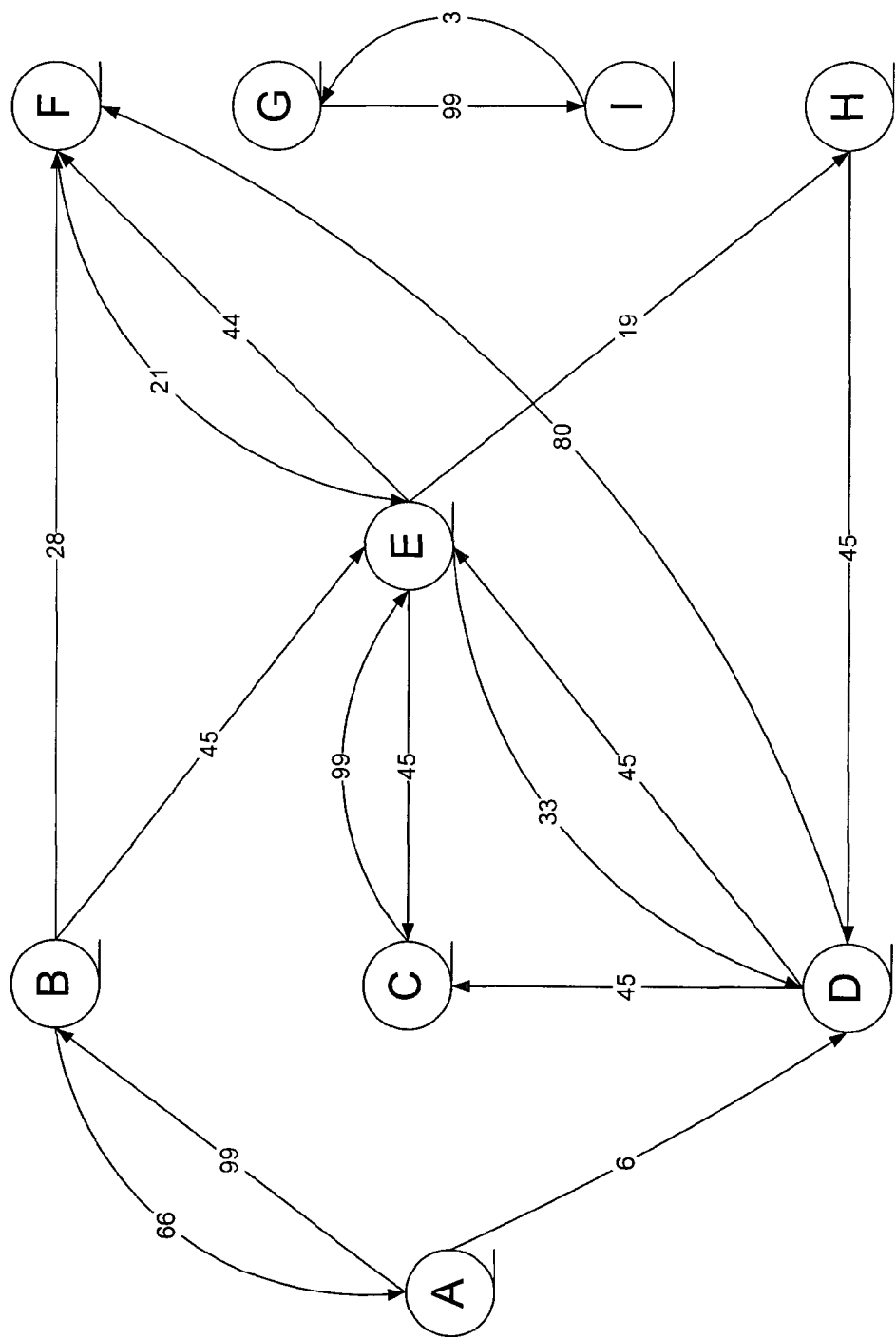
FIG. 5 is another example of a more complicated communication network, illustrating Players A through I in communication links amongst themselves.

Over a period of time, message paths are re-used by a participant. Thus, a participant may send new messages to one or more communication partner(s) to whom the participant has sent prior messages. In one embodiment, the transmission of messages from a participant to a communication partner may be noted by attaching a number to the link. For example, a number attached to the link may start at one and be incremented by one for each time the path is re-used. This number is referred to as strength of the link. FIG. 4 is an example of a communication network illustrating Player A in communication link with communication partners B, C, and D. Each link in the communication network of FIG. 4 includes a strength number corresponding to each link. FIG. 5 is another example of a more complicated communication network, illustrating Players A through I in communication links amongst themselves.

Figure 6:
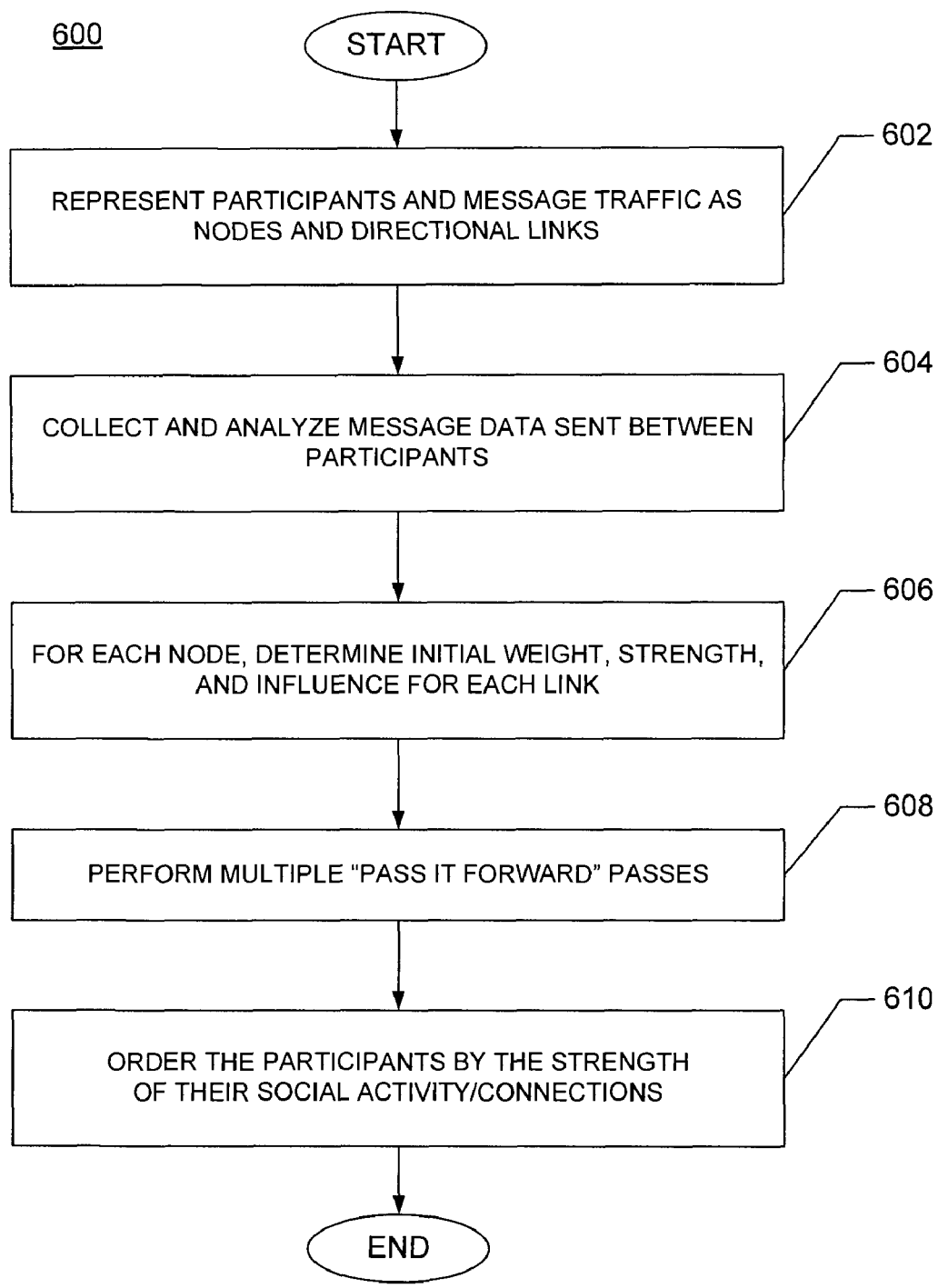
FIG. 6 is a flowchart for determining and selecting influential and/or popular participants in a communication network.

FIG. 6 is a flowchart 600 for determining and selecting influential and/or popular participants in a communication network. Although the flowchart 600 shows the steps for determining influential and/or popular participants in a particular order, the steps can be executed in any order appropriate for meeting the objective of determining the influential/popular participants.

In one implementation, determining influential and/or popular participants in a communication/social network involves determining the relative size and strength of the participants' social connections to the network using a "Pass It Forward" method. In this method, each participant is given an initial weight (of the node) based on the participant's immediate links or connections to the network, which indicate the "status" of that participant in the network. Each participant then "Passes It Forward" (i.e., passes the initial weight of the node forward), contributing part of the participant's status to each of its communication partners. Thus, using this method, "well-connected" participants with higher status value tend to contribute and propagate more of their weight (i.e., "vote more") and also tend to receive more of other participants' weights (i.e., "voted for more").

By repeating the "Pass It Forward" process for a number of times (i.e., making multiple passes across the communication network), the status "flows" out from each participant to its communication partners. The flowing of the status diminishes with increase in the link distance between the participant and a communication partner. Since the "voting" is directional, when one participant does not respond to another participant's communication or contact, the flow occurs in the direction of the link only.

In the illustrated implementation of FIG. 6, participants and message traffic are represented, at box 602, as nodes and directional links, respectively, in a communication network such as the one shown in FIG. 5. For example, the participant designated as Node E is in communication with five communication partners (i.e., Nodes B, C, D, F, and H). Participant E has sent 45, 33, 44, and 19 messages, respectively, to Communication Partners C, D, F, and H. Participant E has also received 45, 99, 45, and 21 messages, respectively, from Communications Partners B, C, D, and F. However, in other implementations, the number associated with each directional link may not necessarily represent the raw number of messages but rather a combination of strength, quantity, and quality of messages.

Then, at box 604, message data exchanged between participants is collected. In one implementation, message data is collected by recording chat messages, and the recorded chat messages are then parsed to find nodes, links, and link strengths. In other implementations, message data is collected by collecting other communication data, such as e-mail messages or voice data. The message data can also include an account ID or other personal identifier, the directionality of the message, the origination/destination of the message, and the size of the message. After the message data is collected, the data can be analyzed to produce other message relevant data such as quality, influence, strength and weight of the message.

Thus, for each node, the message relevant data, such as initial weight, influence, and strength, for each link is determined, at box 606. In one embodiment, determining the message relevant data for a node includes selecting a friendship factor (g), a message weight factor (k), and/or a link strength factor (h) for a participant corresponding to the node. For example, the friendship factor is selected to be less than 1.0 (e.g., g=0.003); the message weight factor is selected to be less than 1.0 (e.g., k=0.3); and the link strength factor is selected to be less than 1.0 (e.g., h=0.2).

Once the message relevant data has been determined, multiple passes of the "Pass It Forward" process are made at 608. As described above, the multiple passes of the "Pass It Forward" process propagate the message relevant data of a node out to other nodes in the network to produce the relative size and strength of the participants' social activity/connections (i.e., the social status of the participant) within the communication network. Finally, at 610, the participants are ordered by the strength of the participants' social activity/connections.

Figure 7:
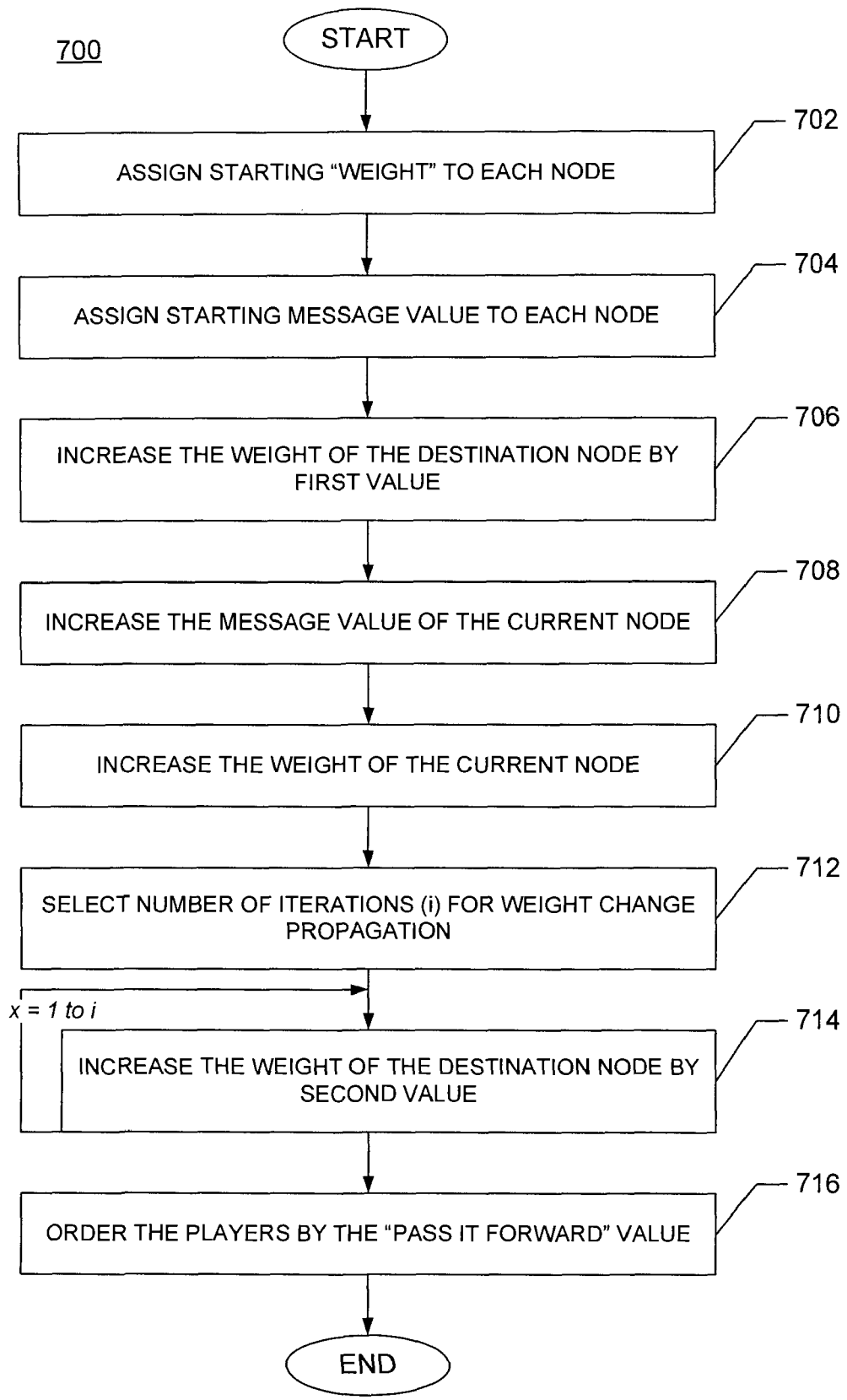
FIG. 7 is a flowchart illustrating the implementation of the "Pass It Forward" or "voting" process.

FIG. 7 is a flowchart 700 illustrating the implementation of the "Pass It Forward" or "voting" process 608 described above. Before the "voting" begins, an arbitrary starting "weight" (e.g., greater than 1.0) is assigned to each node, at box 702. Alternatively, the starting "weight" can be chosen in proportion to other factors such as the node's total number of messages, message paths, or the like. Also, a starting message value (e.g., zero) is assigned to each node, at box 704. In other implementations, other related factors, such as a status factor, can be used in addition to or in place of the factors and weights mentioned in boxes 702 and 704.

In one implementation, the "voting" begins by selecting a current node. For each node selected as the current node, the weight of the destination node (i.e., the destination node for a message) is increased, at box 706, by the friendship factor of each link originating from the current node. At box 708, the message value of the current node is increased by the strength of the link for each link whose destination is the current node. The weight of the current node is then increased by a first value, at box 710. In one example, the first value is selected as a product of the message value of the current node, the friendship factor, the message weight factor, and a "number of links" factor. In one example, the "number of links" factor (l) is calculated as $$l = \frac{\text{a number of links whose destination is the current node} + 100}{100}.$$

In an alternative implementation, weights and factors can be adjusted or processed differently, such as starting with an initial value and decreasing the initial value with a combination of weights and factors. In this alternative implementation, the status of a player can be determined to be higher when the weight of the current node is smaller.

Next, a number of iterations (i) sufficient to allow propagation of weight changes across the network is selected, at box 712. In one implementation, the number of iterations is selected to be the product of the square root of the total number of nodes in the network and an arbitrary constant (e.g., 1.0). Thus, once the number of iterations (i) is selected, the following steps are repeated i times.

For each node selected as a current node, the weight of each destination node—those nodes that are linked to by the current node—is adjusted (e.g., increased), at box 714, by a second value for each link originating from the current node. In one particular example, the second value is selected as a product of the weight of the current node, the strength of the link from the current node to the destination node, the friendship factor (g), and the link strength factor (h). The node weights are assigned "all at once" for all nodes after the votes for the current round have been decided. In other implementations, other related factors, such as a status factor, can be used in addition to or in place of the factors and weights mentioned above. In an alternative implementation, the weight of each node is scaled up or down to prevent "overflow", "underflow", or otherwise unwieldy values.

The final weight value for each node after i iterations is the participant's influence or "Pass It Forward" value. Thus, the participants are ordered by the "Pass It Forward" value, at box 716, to find the participants with the "most powerful" connection to the communication network.

As described above, the "Pass It Forward" process encapsulates much of the information about a participant's interconnectedness in an online communication network into a single value. Thus, with this information, a network service provider, such as a game provider, can identify which participant's networks are sparse and which are rich. Accordingly, this information can be used to identify network community leaders, encourage community and social engagement, and identify participants who may need or desire assistance with socialization. This information can also be used for other purposes, such as targeted network marketing.

Figure 8A:
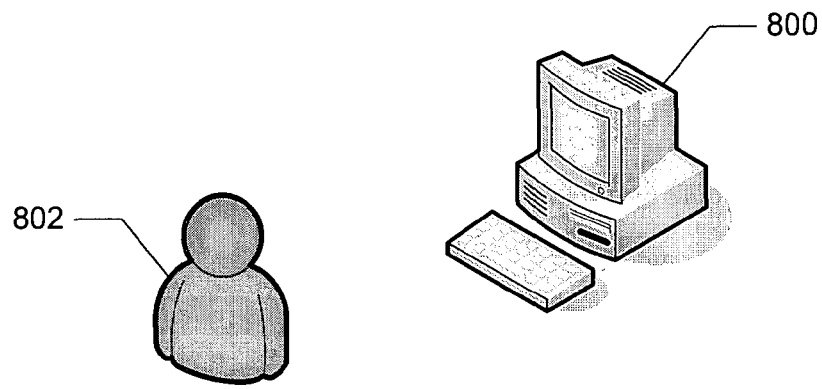
FIG. 8A shows a representation of a computer system and a user.

FIG. 8A shows a representation of a computer system 800 and a user 802. The user 802 can use the computer system 800 to determine influential and/or popular participants in a communication network. In one example, the computer system 800 stores and executes an influential/popular participant selection program 812, which is designed to select influential and/or popular participants. In one embodiment, the program 812 selects the influential/popular participants by analyzing the communications of participants and graphing their social network to provide relative strengths of the participants' social network online, as well as their relative community influence including the size and extent of their online social network.

Figure 8B:
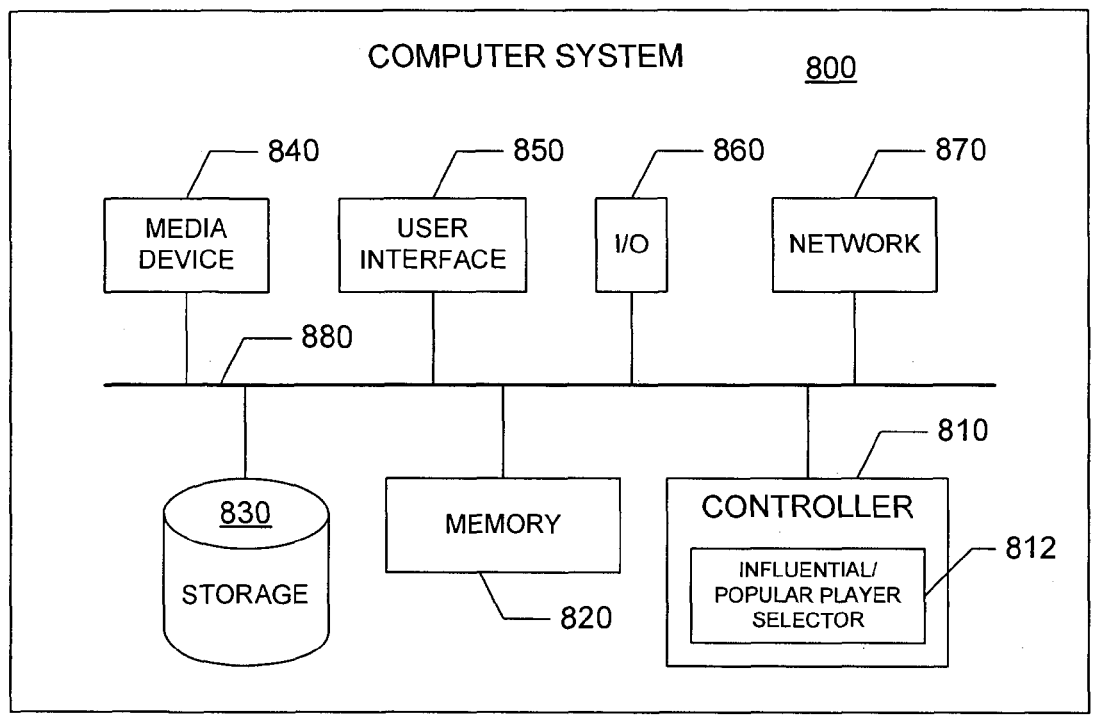
FIG. 8B is a block diagram of one implementation of the computer system in FIG. 10A, including a contact representation program.

FIG. 8B shows a block diagram of one implementation of the computer system 800 in FIG. 8A, including the influential/popular participant selection program 812. The computer system 800 includes a controller 810, a memory 820, storage 830, a media device 840, a participant interface 850, an input/output (I/O) interface 860, and a network interface 870. These components are interconnected by a common bus 880. Alternatively, different connection configurations can be used, such as a star pattern with the controller at the center.

The controller 810 is a programmable processor and controls the operation of the computer system 800 and its components. The controller 810 loads instructions from the memory 820 or an embedded controller memory (not shown) and executes these instructions to control the system. In its execution, the controller 810 provides the influential/popular participant selection program 812 as a software system. Alternatively, this service can be implemented as separate components in the controller 810 or the computer system 800.

Memory 820 stores data temporarily for use by the other components of the computer system 800. In one implementation, memory 820 is implemented as RAM. In one implementation, memory 820 also includes long-term or permanent memory, such as flash memory and/or ROM.

Storage 830 stores data temporarily or long term for use by other components of the computer system 800, such as for storing data used by the influential/popular participant selection program 812. In one implementation, storage 830 is a hard disk drive.

The media device 840 receives removable media and reads and/or writes data to the inserted media. In one implementation, the media device 840 is an optical disc drive.

The user interface 850 includes components for accepting user input from the user of the computer system 800 and presenting information to the user. In one implementation, the user interface 850 includes a keyboard, a mouse, audio speakers, and a display. The controller 810 uses input from the user to adjust the operation of the computer system 800.

The I/O interface 860 includes one or more I/O ports to connect to corresponding I/O devices, such as external storage or supplemental devices (e.g., a printer or a PDA). In one implementation, the ports of the I/O interface 860 include ports such as: USB ports, PCMCIA ports, serial ports, and/or parallel ports. In another implementation, the I/O interface 860 includes a wireless interface for communication with external devices wirelessly.

The network interface 870 includes a wired and/or wireless network connection, such as an RJ-45 or "Wi-Fi" interface (802.11) supporting an Ethernet connection.

The computer system 800 includes additional hardware and software typical of computer systems (e.g., power, cooling, operating system), though these components are not specifically shown in FIG. 8B for simplicity. In other implementations, different configurations of the computer system can be used (e.g., different bus or storage configurations or a multi-processor configuration).

Figure 9:
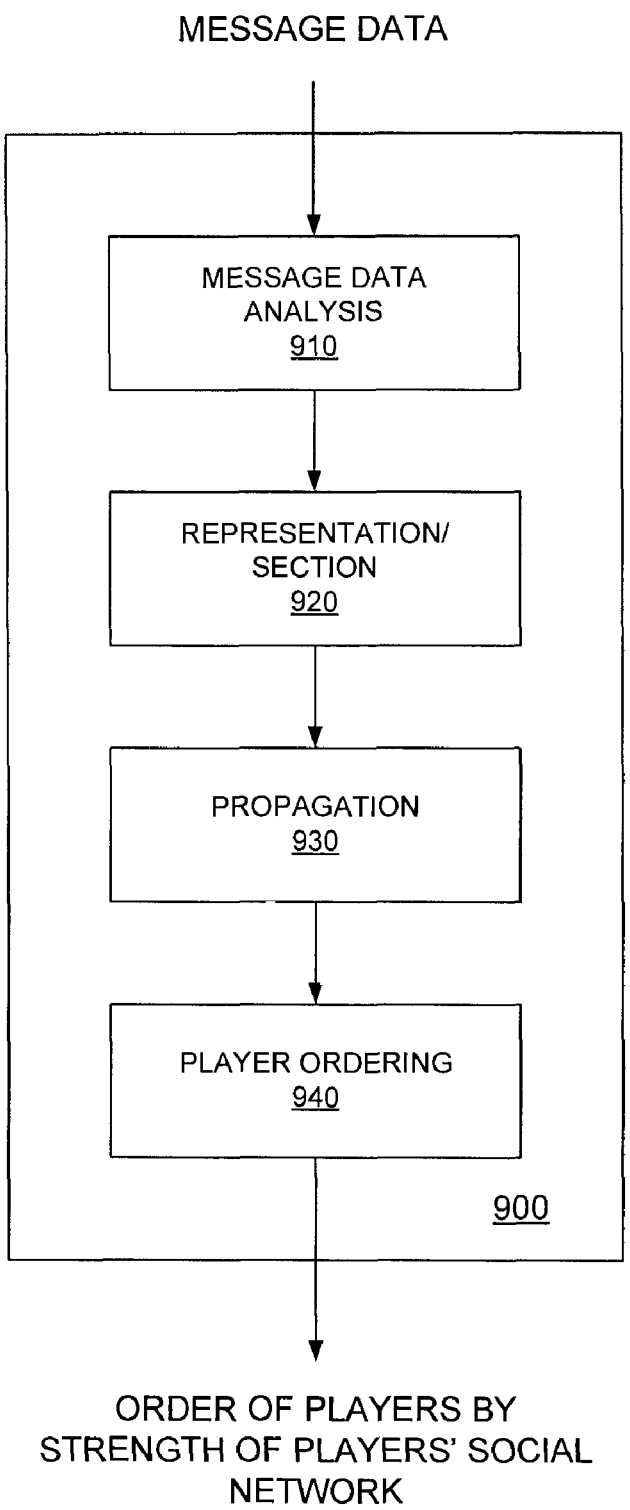
FIG. 9 is a block diagram of a system for determining influential and/or popular participants in a network using messages exchanged among participants.

FIG. 9 is a block diagram of a system 900 for determining and selecting influential/popular participants in a communication network, such as an online game. The system 900 includes a message data analysis module 910, a representation/selection module 920, a propagation module 930, and a participant ordering module 940.

The message analysis module 910 is configured to collect message data sent between participants to represent relevant data such as link strengths. In one implementation, message data is collected by recording chat messages. In other implementations, message data is collected by collecting other communication data, such as e-mail messages or voice data. The representation/selection module 920 is configured to (1) represent participants and message traffic as nodes and directional links, respectively, in the network; (2) select values for friendship factor, message weight factor, and link strength factor; and (3) for each node, select weight and influence of the node for each link from that node. The propagation module 930 is configured to make multiple passes across the network using the message relevant data to propagate the influence and weight of each node across the network and to determine relative size and strength of the participants' social network/activity. The participant-ordering module 940 is configured to order the participants by the strength of the participants' social network/activity.

Various implementations of the invention are realized in electronic hardware, computer software, or combinations of these technologies. Some implementations include one or more computer programs executed by a programmable processor or computer. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description indicates that "influence", of the participants can be sufficiently propagated by iterating on the "Pass It Forward" process for a number equal to the square root of the total number of nodes in the network, the "Pass It Forward" process can be iterated for less or more than the square root of the total number of nodes in the network. Accordingly, the present invention is not limited to only those implementations described above.

What is claimed is:

1. A computer-implemented method for determining influential and/or popular participants in an online game network using messages exchanged among a group of participants, the method comprising:
    representing the group of participants and the messages exchanged among participants on a game network server as nodes and links, respectively;
    analyzing the messages to produce message relevant data for each node;
    propagating the message relevant data of said each node out to other nodes in the network to propagate influence factors, which are graphically represented as link strengths, among neighboring nodes; and
    repeating said propagating the message relevant data a sufficient number of times to spread the influence factors among neighboring nodes to produce a corresponding influence value for said each node,
    wherein said influence value indicates relative size and strength of social activity or connections of a participant corresponding to said each node, and is determined by a combination of outbound influence factors to the neighboring nodes and inbound influence factors from the neighboring nodes, and
    wherein a most influential and/or popular participant is identified by a highest influence value;
    wherein said analyzing the messages to produce message relevant data includes
    selecting a friendship factor, a link strength factor, a message weight factor, for said each node,
    wherein a starting weight for each factor is chosen in proportion to other factors including a total number of messages and message paths for said each node;
    wherein said propagating said message relevant data includes:
    designating said each node as a current node; and
    selecting a weight and a message value for said each current node, and a link strength value for each link originating from said each current node;
    wherein said propagating the message relevant data further comprises:
    first increasing the weight of destination nodes by the product of the weight of said each current node, the friendship factor, the link strength factor, and the link strength value, for all links originating from said each current node;
    second increasing the message value of said each current node by the link strength value, and the weight of said each current node by a first value, for all links whose destination is said each current node.

2. The method of claim 1, further comprising
    ordering the group of participants by a plurality of influence values produced for the group of participants.

3. The method of claim 1, wherein said analyzing the messages includes:
    recording chat messages; and
    parsing the recorded chat messages to find said nodes and links.

4. The method of claim 1, wherein said first value is selected as a product of the message value of said each current node, the friendship factor, the message weight factor, and a number of links factor.

5. The method of claim 4, wherein said number of links factor is proportional to a number of links whose destination is said each current node.

6. The method of claim 1, wherein said first increasing the weight includes scaling the weight to prevent overflow and underflow.

7. The method of claim 1, wherein said repeating said propagating the message relevant data comprises:
    repeating said first increasing and said second increasing with newly-updated weight and message value for said each node.

8. The method of claim 7, wherein said repeating said first increasing and said second increasing includes
    repeating for a number of iterations equal to the square root of the total number of nodes in the network.

9. The method of claim 1, wherein a number associated with each factor of the outbound influence factors and the inbound influence factors represents a number of messages sent between said each node and the neighboring nodes.

10. The method of claim 1, wherein a number associated with each factor of the outbound influence factors and the inbound influence factors represents a combination of strength, quantity, and quality of messages sent between said each node and the neighboring nodes.

11. A system for determining influential and/or popular participants in an online game network using messages exchanged among a group of participants, the system comprising a processor configured to execute:
a representation module, the representation module configured to represent the group of participants and the messages exchanged among the group of participants as nodes and links, respectively, wherein the group of participants exchange messages via a user interface of a computer system over the network;
a message data analysis module, the message data analysis module configured to analyze the messages exchanged over the network to produce message relevant data for each node, wherein each node is associated with a computer system representing a participant of the group of participants; and
a propagation module, the propagation module configured to propagate the message relevant data of said each node out to other nodes in the network to propagate influence factors, which are graphically represented as link strengths, among neighboring nodes, and to repeat the propagation of the message relevant data a sufficient number of times to spread the influence factors among neighboring nodes to produce an influence value for said each node,
wherein said influence value indicates relative size and strength of social activity or connections of a participant corresponding to said each node, and is determined by a combination of outbound influence factors to the neighboring nodes and inbound influence factors from the neighboring nodes, and
wherein a most influential and/or popular participant is identified by a highest influence value;
wherein said message data analysis module includes a first selector to select a friendship factor, a link strength factor, a message weight factor, for said each node;
wherein said propagation module includes: a designating module to designate said each node as a current node; and a second selector to select a weight and a message value for said each current node, and a link strength value for each link originating from said each current node;
wherein said propagation module further comprises:
a first adjustment module to increase the weight of destination nodes by the product of the weight of said each current node, the friendship factor, the link strength factor, and the link strength value, for all links originating from said each current node; and
a second adjustment module to increase the message value of said each current node by the link strength value, and the weight of said each current node by a first value, for all links whose destination is said each current node,
wherein said first and second adjustment modules further operate to repeat the adjustment processes with newly-updated weight and message value for said each node.

12. The system of claim 11, the processor further configured to execute a participant ordering module, the participant ordering module configured to order the group of participants by a plurality of influences values produced for the group of participants.

13. The system of claim 11, wherein said message data analysis module includes:
a message recorder to record chat messages; and
a parsing module to parse the recorded chat messages to find said nodes and links.

14. The system of claim 11, wherein the adjustment processes are repeated for a number of iterations equal to the square root of the total number of nodes in the network.

15. The system of claim 11, wherein said first value is selected as a product of the message value of said each current node, the friendship factor, the message weight factor, and a number of links factor.

16. The system of claim 15, wherein said number of links factor is proportional to a number of links whose destination is said each current node.

17. The system of claim 11, wherein said first adjustment module includes a scaling module to scale the weight to prevent overflow and underflow.

18. A computer program, stored in a non-transmission computer-readable storage medium, for determining influential and/or popular participants in an online game network using messages exchanged among a group of participants, the program comprising executable instructions that cause a computer to:
represent the group of participants and the messages exchanged among the group of participants as nodes and links, respectively;
analyze the messages to produce message relevant data for each node;
propagate said message relevant data of said each node out to other nodes in the network to propagate influence factors, which are graphically represented as link strengths, among neighboring nodes; and
repeat said propagating the message relevant data a sufficient number of times to spread the influence factors among neighboring nodes to produce an influence value for said each node,
wherein said influence value indicates relative size and strength of social activity or connections of a participant corresponding to said each node, and is determined by a combination of outbound influence factors to the neighboring nodes and inbound influence factors from the neighboring nodes, and
wherein a most influential and/or popular participant is identified by a highest influence value;
wherein said analyzing the messages to produce message relevant data includes
selecting a friendship factor, a link strength factor, a message weight factor, for said each node;
wherein a starting weight for each factor is chosen in proportion to other factors including a total number of messages and message paths for said each node;
wherein said propagating said message relevant data includes:
designating said each node as a current node; and
selecting a weight and a message value for said each current node, and a link strength value for each link originating from said each current node;
wherein said propagating the message relevant data further comprises:
first increasing the weight of destination nodes by the product of the weight of said each current node, the friendship factor, the link strength factor, and the link strength value, for all links originating from said each current node;
second increasing the message value of said each current node by the link strength value, and the weight of said each current node by a first value, for all links whose destination is said each current node.

19. An apparatus for determining influential and/or popular participants in an online game network using messages exchanged among a group of participants, comprising:

a processor including
  means for representing the group of participants and the messages exchanged among the group of participants as nodes and links, respectively;
  means for analyzing the messages to produce message relevant data for each node; and
  means for propagating the message relevant data of said each node out to other nodes in the network to propagate influence factors, which are graphically represented as link strengths, among neighboring nodes, and to repeat the propagation of the message relevant data a sufficient number of times to spread the influence factors among neighboring nodes to produce an influence value for said each node,
  wherein said influence value indicates relative size and strength of social activity or connections of a participant corresponding to said each node, and is determined by a combination of outbound influence factors to the neighboring nodes and inbound influence factors from the neighboring nodes, and
  wherein a most influential and/or popular participant is identified by a highest influence value;
  wherein said analyzing the messages to produce message relevant data includes
  selecting a friendship factor, a link strength factor, a message weight factor, for said each node,
  wherein a starting weight for each factor is chosen in proportion to other factors including a total number of messages and message paths for said each node;
  wherein said propagating said message relevant data includes:
  designating said each node as a current node; and
  selecting a weight and a message value for said each current node, and a link strength value for each link originating from said each current node;
  wherein said propagating the message relevant data further comprises:
  first increasing the weight of destination nodes by the product of the weight of said each current node, the friendship factor, the link strength factor, and the link strength value, for all links originating from said each current node;
  second increasing the message value of said each current node by the link strength value, and the weight of said each current node by a first value, for all links whose destination is said each current node.

* * * * *